United States Patent [19] [11] 4,419,490
Bayer et al. [45] Dec. 6, 1983

[54] POLYMERIC HYDROGENATION CATALYSTS, THE PRODUCTION THEREOF AND THEIR USE TO PROMOTE HYDROGENATION

[75] Inventors: Ernst Bayer; Wilhelm Schumann, both of Tubingen, Fed. Rep. of Germany

[73] Assignee: Heyl & Co. Chemisch-Pharmazeutische Fabrik, Fed. Rep. of Germany

[21] Appl. No.: 273,068

[22] Filed: Jun. 12, 1981

Related U.S. Application Data

[63] Continuation of Ser. No. 62,760, Aug. 1, 1979, abandoned.

[30] Foreign Application Priority Data

Aug. 17, 1978 [DE] Fed. Rep. of Germany ....... 2835943
May 10, 1979 [DE] Fed. Rep. of Germany ....... 2918942

[51] Int. Cl.$^3$ .............................................. C08F 8/42
[52] U.S. Cl. .................................. 525/61; 525/326.4; 525/328.2; 525/329.1; 525/330.2; 525/339; 525/370; 525/371; 525/420; 525/453; 525/196; 536/85
[58] Field of Search ................... 252/431 N; 525/371, 525/339, 326.9, 328.2, 329.1, 330.2, 420, 453, 61, 196; 536/85; 260/113, 115

[56] References Cited

U.S. PATENT DOCUMENTS

| 3,674,768 | 7/1972 | Allum et al. ................. 525/371 |
| 3,824,221 | 7/1974 | Ragg ........................... 525/371 |
| 3,890,281 | 6/1975 | Angstadt et al. ............ 525/371 |
| 4,098,727 | 7/1978 | Haag et al. .................... 521/53 |
| 4,107,079 | 8/1978 | Chevallier et al. ....... 252/431 N |
| 4,111,856 | 9/1978 | Haag et al. ............... 252/431 N |
| 4,123,396 | 10/1978 | Rembaum et al. ........... 525/371 |
| 4,145,486 | 3/1979 | Haag et al. ............... 252/431 N |

FOREIGN PATENT DOCUMENTS 2326489 5/1973 Fed. Rep. of Germany .

Primary Examiner—Joseph L. Schofer
Assistant Examiner—Bernard Lipman
Attorney, Agent, or Firm—Steinberg & Raskin

[57] ABSTRACT

The invention relates to polymeric soluble hydrogenation catalysts in which a metal of the eighth subgroup of the periodic system is bound by covalent and/or secondary valent bond to a soluble polymer. The hydrogenation catalysts are produced by reacting the selected polymer having a functional group with a metal, metal complex or metal salt wherein the metal is of the eighth subgroup of the periodic table, the reaction taking place in aqueous solution or in solution in an organic solvent. The catalysts of the invention can be used for the catalytic hydrogenation of organic compounds in solution.

18 Claims, No Drawings

POLYMERIC HYDROGENATION CATALYSTS, THE PRODUCTION THEREOF AND THEIR USE TO PROMOTE HYDROGENATION

This is a continuation, of application Ser. No. 62,760, filed Aug. 1, 1979 abandoned.

BACKGROUND OF THE INVENTION

Carrying out of hydrogenation with low molecular metal catalysts in homogeneous solution has found practically no application either in laboratory or in technical processing because of the great problem resulting from the need to separate the reaction product and the catalyst from each other. Research has therefore been effected to bind low molecular homogeneous catalysts to polymers with phosphine groups. The use of insoluble polymers results in heterogeneity. These polymeric complexes with triphenylphosphine groups exhibit to some extent poor selectivity and stability as do the low molecular complexes.

SUMMARY OF THE INVENTION

Generally speaking in accordance with this invention, there is provided polymeric, soluble hydrogenation catalysts which are formed of metal or metal salt of a metal of the eighth subgroup of the periodic table bound covalently or by secondary valences to a soluble polymer which may be synthetic or semi-synthetic.

It is accordingly a primary object of the present invention to provide new polymeric hydrogenation catalysts which are soluble in the common hydrogenation solvents and which promote hydrogenation more quickly and more selectively than do the known catalysts, and furthermore can be easily separated from the resulting product and remain fully active over long periods of time.

It is yet a further object of the present invention to provide the production of these new hydrogenation catalysts.

It is yet a further object of the invention to provide for the hydrogenation of organic substances in solution utilizing the hydrogenation catalysts of this invention.

Other objects and advantages of the present invention will be apparent from a further reading of the specification and of the appended claims.

It has quite surprisingly been found that the new soluble, polymeric hydrogenation catalysts which are obtained quite simply by covalent and secondary valent binding of metals of the eighth subgroup of the periodic system or their salts to soluble polymers, either synthetic or semi-synthetic, are highly effective for various hydrogenation reactions. According to the basic structure of the polymer there is obtained soluble hydrogenation catalysts which can be used for hydrogenation in common solvents.

The polymeric hydrogenation catalysts of the present invention can be separated from low molecular starting products and also from reaction products by normal procedures such as precipitation, distillation and extraction, as well as, based upon the difference in molecular weight, by dia filtration and gel chromatography. Consequently the separation problem is simplified with consequent protection of the advantages of homogeneous carrying through of the reaction.

The preferred hydrogenation catalysts of the present invention are those which are obtained based upon polyvinyl alcohols, polyvinyl pyrrolidone, polyacrylonitrile, polyacrylic acid, polyethylene glycol, polypropylene glycol, functionalized polystyrene, carboxymethyl cellulose, polyurethanes, polyvinyl amines, polyethylene imines, as well as synthetic and semi-synthetic polyamides, polypeptides and polymeric polyhydroxy compounds, and mixtures of these polymers.

The molecular weight of the polymers can be varied within wide range, for example between 1000 and 1 000 000, preferably between about 5000 and 300,000, most preferably between 5 000 and 100,000.

In accordance with the present invention it has been found that the mentioned polymers can be directly reacted with metal salts or metal complexes of metals or metal ions of the elements of the eighth subgroup of the periodic table. Advantageously, the metal salts or metal complexes are those formed from Fe, Co, Ni, Ru, Rh, Pd, Os, Ir and Pt.

The loading of the functionalized polymers with metals or metal ions varies in wide range. It has been found preferred to bind from about 0.1–10% of metal onto the polymer. The higher loading does not increase the speed of the hydrogenation.

The production of the metal-loaded polymers proceeds in general in very simple manner, namely by reaction of at least one of the above named polymeric components with a metal salt, metal complex or metal of the eighth subgroup of the periodic system, in aqueous solution or in an organic solvent.

The thus formed metal or metal ion-containing polymers are separated from lower molecular components in accordance with the invention by dia filtration, and purified, and can be used for hydrogenation in solution without further isolation. If isolation is desired, this can be effected by precipitation, reprecipitation, evaporation of the solvent or lyophilization. In general, metals or metal ions of the eighth subgroup of the periodic system are reacted with polymers of the above indicated type and utilized in accordance with the invention as hydrogenation catalysts.

It is possible to use as starting polymers for the production of the polymeric hydrogenation catalysts of the present invention, in addition to the polymers as such mentioned above, also polymers which are changed by functionalization, in which other metal binding groups are introduced into the basic polymer. In addition to the already mentioned phosphine groups, it is possible to introduce as metal binding functional groups into the polymer sulfonic acid, carbonyl, carboxyl, amino, imino, hydroxyl, cyano and/or acid amide groups. The metal compounds can also be bound in accordance with the present invention by olefines or aromatics as $\eta$-complexes or by carbon metal bonds. In accordance with the present invention the metal or metal ion can also be bound, in addition to the polymeric component as indicated above, also to low molecular ligands by coordinative or salt-forming bonds, for example phosphines such as triphenyl phosphine, carbon monoxide, halogenides, particularly chloride, cyanide, nitrile, alkene, alkine and particularly advantageously acetylene, and/or cyclopentadiene anions.

Especially preferred hydrogenation catalysts of the present invention are those wherein a metal or metal salt of the eighth subgroup of the periodic system, preferably metallic palladium or a palladium salt is covalently and/or secondary valently bound to soluble, synthetic or semi-synthetic polymers, wherein additionally at least one low molecular ligand is bound to the metal.

These preferred hydrogenation catalysts may comprise the following low molecular ligands:
(a) an amine;
(b) an amino acid;
(c) a nitrile of the general formula I:

$$R-(CHR^1)_n-CN \qquad (I)$$

wherein R is a phenyl, naphthyl, anthracenyl or phenanthrenyl radical with may be substituted by one or several linear or branched $C_1$ to $C_6$ alkyl radicals, or wherein R is a linear or branched $C_1$ to $C_6$ alkyl radical, $R^1$ designates hydrogen or a linear or branched $C_1$ to $C_6$ alkyl radical and wherein n has the meanings 0, 1 or 2;
(d) a phosphine of the general formula II

$$P(R^2)_3 \qquad (II)$$

wherein the radicals $R^2$ may be the same or different and may designate linear or branched $C_1$ to $C_6$ alkyl radicals, phenyl or phenyl substituted by one or more linear or branched $C_1$ to $C_6$ alkyl radicals or $C_1$ to $C_6$ alkoxy radicals, including unsubstituted triphenylphosphine;
(e) an olefine or alkine, including cyclic olefines and alkines; or
(f) a phosphorylide.

Especially advantageous low molecular ligands of the aforementioned type are the following:
(a) amines of the following type: primary, secondary and tertiary amines with bulky aliphatic, alicyclic and aromatic substituents, particularly with branched aliphatic groups of 4 to 16 carbon atoms, for example with isopropyl, tertiary butyl and neopentyl radicals;
(b) amines with alicyclic radicals, for example cyclopentyl, cyclohexyl and adamantyl radicals;
(c) araliphatic amines, the alkyl portion of which comprises 1 to 6 carbon atoms and which on the aliphatic chain contain at least one aromatic radical, particularly at least one phenyl radical and/or at least one naphthyl, anthracenyl or phenanthrenyl radical. Particularly preferred ligands of this type are phenylethylamines, especially 1-phenylethylamine; diphenylethylamines, particularly 1,1-diphenylethylamine, and phenylpropylamines. In the araliphatic amines of the designated type the bulky groups, especially the aromatic radical, are preferably in the 1- or 2-position with respect to the amino group on the aliphatic chain.

As nitrile ligands of the above general formula I especially those are preferred, wherein the cyano group is bound directly to the aromatic system, especially the phenyl, naphthyl, anthracenyl or phenanthrenyl radical. In this configuration the cyano group may be attached to any position of the said radicals. The aromatic radicals may also be substituted by one or two short chain aliphatic branched or linear radicals, especially by $C_1$ to $C_6$ alkyl radicals. These substituents may particularly be bulky alkyl radicals, for example tertiary butyl, amyl, neopentyl, etc.

Suitable nitriles are also those, wherein the cyano group may be separated from the said aromatic radicals by one or two carbon atoms. These alkylene bridged nitriles may contain at carbon atom 1 a branched or linear $C_1$ to $C_6$ alkyl radical, for example a methyl, ethyl, n-propyl, isopropyl, n-butyl, sec.-butyl, tert.-butyl, amyl, neopentyl or hexyl radical.

Suitable amino acids are those with bulky groups in 1- to 3-positions to the amino group. Preferred compounds of this type are for example diphenylglycine, norleucine, leucine, isoleucine, tertiary-leucine, valine, etc.

Suitable phosphine ligands are for example arylphosphines, which may also be substituted at the aryl nucleus, particularly at a phenyl nucleus by one or several lower alkoxy groups or lower alkyl radicals. Especially preferred is triphenylphosphine substituted on the phenyl nuclei by the said groups.

Suitable olefines may be e.g. cis- or trans-monolefines with 2 to 12 carbon atoms, the carbon chain of which may be substituted by other groups, for example alkyl radicals of 1 to 6 carbon atoms, halogens, e.g. F, Cl, Br, I, cyano groups, carbonyl groups, carboxyl groups, amino groups, amido groups, etc. Examples are: Ethylene, propylene, n-butene(1), n-butene(2), n-pentene(1), n-pentene(2), n-pentene(3), n-hexene(1), n-hexene(2), n-hexene(3), isopentenes, isohexenes, n- and iso-heptenes, n- and iso-octenes, n- and iso-nonenes, n- and iso-decenes, n- and iso-dodecenes, isobutylene, 2-methyl-butene(1), 3-methyl-butene(1), n-heptene(1), n-octene(1), allyl chloride, allyl bromide, etc.; cis- or trans-di- and polyolefines, for example di- and tri-olefines with 4 to 12 carbon atoms. These compounds may be substituted by other substituents, for example alkyl groups with 1 to 6 carbon atoms, halogen atoms, C≡N-groups, carbonyl groups, carboxyl groups, hydroxy groups, etc. Examples for this type of compounds are butadiene(1.3), 2.3-dimethylbutadiene(1.3), pentadienes, hexadienes, hexatriene, dodecatrienes, etc.

Examples for suitable alkines include those with 2 to 12 carbon atoms, for example acetylene, methylacetylene, ethyl-acetylene, dimethyl-acetylene, pentine(1), pentine(2), 3-methylbutine(1), hexine(1), hexine(2), hexine(3), 3.3-dimethylbutine(1), etc. As is the case with the aforementioned olefines, the alkines may also be substituted by suitable functional groups, e.g. carboxyl groups, e.g. acetylene-dicarboxylic acid, hydroxy groups, halogenes, alkyl groups with 1 to 6 carbon atoms. etc.

Suitable cyclic dienes are for example 1,3-cyclohexadiene, 1,4-cyclohexadiene and the cyclooctadienes, particularly 1,3-cyclooctadiene and 1,5-cyclooctadiene.

Suitable liquids are also phosphorylides, for example methylentriphenylphosphorane, wherein the hydrogen atoms of the methylene group may be substituted by aliphatic or aromatic radicals, particularly by $C_1$ to $C_6$-alkyl, phenyl, benzyl, or wherein the methylene grouping may be part of an alicyclic ring system.

In general it is observed that the selectivity increases with increasing bulkyness of the ligands. Thus it was found that the selectivity upon using benzonitrile as a ligand was not exceedingly high; upon using naphthonitrile however the selectivity significantly increased. Upon using cyanoanthracene the selectivity was very high.

A comparable observation may be made with amines. The selectivity of 1,1-diphenylethylamine for example is markedly higher than the selectivity of 1-phenylethylamine as a ligand, even though also the latter compound already results in a marked increase in selectivity.

The drawbacks of the known methods for hydrogenation of fats are that the desired unsaturated cis-fatty acid esters are per-hydrogenated to a large extent. Another drawback is that the major part of the compounds are isomerized to the less desirable trans-compounds.

In contrast to those known methods for the hydrogenation of fats, the hydrogenation catalysts according to the invention, particularly those with low molecular ligands, present the advantage that by using them for the hydrogenation of fat it is possible to perform a selective hydrogenation. Thus it is possible to hydrogenate selectively only one double bond or two double bonds in fatty residues with several sites of unsaturation. During this procedure the cis-configuration of the natural starting material will be maintained to a large extent and quite often completely. Practically no isomerization of the double bonds occurs, that is there will be no migration of the double bonds.

The above observations clearly show that upon using the present hydrogenation catalysts the drawback of the known hydrogenation methods, namely the exhaustive hydrogenation to completely saturated fats is avoided. It is possible according to the present invention to stop the partial hydrogenation at the desired level of partial hydrogenation.

The hydrogenation catalysts according to the present invention with low molecular ligands may be prepared by reacting a metal salt or a metal complex of a metal of the eighth subgroup of the periodic table, preferably a palladium salt or a palladium complex, containing a low molecular ligand, in aqueous solution or in organic solvents with the polymer and thereafter hydrogenating if desired.

According to a preferred embodiment the method for producing a hydrogenation catalyst of the present invention with a low molecular ligand comprises using the solution of the catalyst as a hydrogenation catalyst either directly or after separating low molecular starting materials and reaction products therefrom.

The thus prepared hydrogenation catalysts may be separated from low molecular components and purified by dia filtration or may be used for hydrogenation processes in solution without any isolating operation. If desired, the hydrogenation catalysts may be isolated in substance by precipitation, re-precipitation, evaporation of the solvent or lyophilization.

The polymeric catalysts of the present invention may be used in accordance with the present invention for the catalytic hydrogenation of a wide variety of organic compounds in water or organic solvents, at room temperature or increased temperatures, under pressure or at normal pressure. The catalysts of the invention may also be used in suspension, for example as emulsion of fats, or fatty acids in water. Thus, nitro, nitroso, and cyano groups can be hydrogenated to amines.

The hydrogenation catalysts of the invention may also be used for the hydrogenation of olefines, acetylene, aromatics, C=O—, C=N— and N=N— compounds.

Depending upon the metal or the polymer, the obtained catalysts are particularly suitable for specific hydrogenation purposes. Thus, depending upon the structure of the polymeric metal complexes of the invention specific C≡C-triple bond compounds may be hydrogenated to cis- or trans-olefines, and in organic compounds with several C=C-double bonds, specific individual double bonds may be hydrogenated with greater speed than other double bond compounds. The polymeric hydrogenation catalysts may be used in accordance with the present invention both for discontinuous and continuous processing. They may be re-used repeatedly.

DESCRIPTION OF PREFERRED EMBODIMENTS

The following Examples are given to further illustrate the present invention. The scope of the invention is not, however, meant to be limited to the specific details of the examples.

EXAMPLE 1

Production of a palladium polymer in aqueous solution:

25 ml of 1% aqueous solution of polyvinyl alcohol (molecular weight 72,000) are reacted at room temperature with 1 ml of aqueous $PdCl_2$-suspension (corresponding to 10 mg Pd) and 0,5 ml of 4% aqueous $Na_2CO_3$-solution are added dropwise. The reaction vessel is then filled with water to 50 ml, reduced with $H_2$ and subjected to dia filtration for 12 hours through a membrane with an exclusion range of 3000 under constant volume. The solution with a Pd-content of about 0,2 mg Pd/ml can be directly used for hydrogenation. For isolation, the retained material is lyophilized. The yield is 0.23 g polymeric palladium compound containing 3.9% Pd.

Following the above procedure it is also possible to produce polymeric palladium compounds with polyvinyl pyrrolidone (e.g. Luviskol K 70, BASF) and carboxymethyl cellulose (Relatin, Henckel A.G.). It is analogously reacted with 25 ml of 1% polymer solution.

EXAMPLE 2

Production of palladium polymers in organic solvents 1 ml of aqueous suspension of $PdCl_2$ (Pd-content: 10 mg) are added at room temperature to 25 ml of 1% solution of polyvinyl alcohol (molecular weight 72,000) in methanol (or propanol). 1 ml of 2% triethylamine solution is then added dropwise, the vessel is filled with methanol (or propanol) to 50 ml, reduced with $H_2$ and subjected to dia filtration for 24 hours through a polyamide membrane (exclusion range 10,000). The retentate as filled to 50 ml with methanol (or propanol) contains about 0,2 mg Pd/ml and can be directly used for hydrogenation purposes. For isolation of the catalyst, the retentate which has been freed of low molecular impurities by dia filtration is separated from the solvent by evaporation to dryness. The yield is 0,24 g (Pd-content 3.8%).

EXAMPLE 3

Production of a palladium-polyvinyl pyrrolidone 25 ml of 1% methanolic solution of polyvinyl pyrrolidone are reacted with 38 mg $PdCl_2.2C_6H_5CN$ at room temperature under stirring. There is then added dropwise 1 ml of 2% methanolic triethylamine solution, the vessel is filled to 50 ml with methanol, reduced with hydrogen and subjected to dia filtration for 24 hours under constant volume. The retentate can be directly used as catalyst for hydrogenation purposes. For isolation of the substance, the retentate is evaporated to dryness. The yield is 0.22 g (Pd-content 3.95%).

EXAMPLE 4

Production of a platinum-polyvinyl pyrrolidone

Following the procedure of Example 3, 25 ml of 1% aqueous solution of polyvinyl pyrrolidone are reacted with 1 ml of aqueous solution of $K_2[PtCl_4]$ (platinum content: 10 mg). The yield is 0.23 g with a Pt-content of 3.7%.

EXAMPLE 5

Production of a rhodium-polyvinyl pyrrolidone 25 ml of aqueous 1% solution of polyvinyl pyrrolidone are reacted with 15 mg of $Rh(OH)_3$, filled with methanol to 50 ml and reduced with $H_2$. It is then subjected to dia filtration for 18 hours through a polyamide membrane (exclusion range 10,000) under constant volume. The rhodium polymer can be directly used in solution for hydrogenation. For isolation, the material is evaporated to dryness under vacuum. The yield is 2.2 g (Rh-content: 2.1%).

EXAMPLE 6

Production of a ruthenium-polyvinyl pyrrolidone 15 mg of $Ru(OH)_3$ are reacted with 25 ml of 1% polyvinyl pyrrolidone solution in accordance with Example 5. The yield is 2.05 g of ruthenium-polyvinyl pyrrolidone containing 3.5% Ru.

EXAMPLE 7

Production of an iridium-polyvinyl pyrrolidone 25 ml of aqueous solution of polyvinyl pyrrolidone are, following the procedure of Example 1, reacted with 1 ml of aqueous solution of $Na_3[IrCl_6]$ (10 g iridium). The yield is 2.1 g with an iridium content of 3.5%.

EXAMPLE 8

Production of osmium-polyvinylpyrrolidone 25 ml of 1% methanolic solution of polyvinyl pyrrolidine are reacted at room temperature with 13 mg of osmium tetraoxide and acetylene is passed through the solution for 30 minutes. It is then filled with methanol to 50 ml and dia filtered in normal manner under constant volume. The retentate material can be directly used for hydrogenation purposes. For isolation it is evaporated to dryness under vacuum. The yield is 2.1 g with an osmium content of 4.0 g.

EXAMPLE 9

Production of a polyacrylonitrile-palladium compound in situ and its use for selective hydrogenation of alkines to alkenes:

25 ml of 1% solution of linear polyacrylonitrile (molecular weight $10^6$ dalton) in N-methylpyrrolidone (NMP) are reacted at room temperature with 17 mg of solid $PdCl_2$, 1 ml of 2% solution of triethylamine in NMP is added and the mixture is diluted to 50 ml with NMP.

10 ml of the solution is introduced into a hydrogenation vessel, flushed three times with $H_2$ and stirred under $H_2$ for 12 hours. After this 1 mMol of pentine-(2) is added and hydrogenated at room temperature and 1 bar. After 20–60 minutes there is by gas chromatography analysis determined to be 96% cis-pentene-(2) as well as 2% trans-pentene-(2) and 2% n-pentane.

EXAMPLE 10

Production of a polyacrylonitrile-palladium-triphenylphosphine in situ and its use for the selective hydrogenation of alkines to alkenes 50 ml of a solution of polyacrylonitrile-palladium complex is produced as in Example 9. 10.5 mg of triphenyl phosphine is added to the solution.

10 ml of the solution is subjected to prehydrogenation as in Example 9. Thereafter 1 mMol of pentine-(1) are added and hydrogenated. After 20–60 minutes there is found by gas chromatography a yield of 97% pentene-1 and 3% n-pentane. After separation of the reaction mixture by distillation or ultra filtration the catalyst can again be utilized.

EXAMPLE 11

Hydrogenation of nitro compounds with polymeric catalysts

Catalyst solutions prepared according to examples 1, 2, 3 or 4 are utilized, 5 ml each time for hydrogenation as described below.

5 ml of in situ produced catalyst solution is diluted with 30 ml of distilled water, rinsed three times with $H_2$ and stirred under hydrogen for 30 minutes for prehydration. There is then added 1 mMol of p-nitrophenol which is hydrogenated at room temperature and 1 bar. It is thereafter filtered at constant volume at 2 bar through a polysulfone membrane with an exclusion range of 10,000. P-aminophenyl in 95% yield is obtained in the filtrate. The hydrogenation time is lowered depending upon the polymerization catalyst between 20–120 minutes. The retained material contains the catalyst which can again be utilized for hydrogenation.

EXAMPLE 12

Hydrogenation of aromatics to cycloaliphatics with polymeric rhodium-, ruthenium- and iridium-compounds:

5 ml of the polymeric catalyst solution produced according to Example 5, 6 or 7 in a hydrogenation flask are diluted with 30 ml distilled water, flushed three times with hydrogen and prehydrogenated by stirring at 60° C. under hydrogen for 24 hours. There is then added 1 mMol of p-nitrophenol which is hydrogenated at room temperature and 1 bar. The hydrogenation requires, depending upon the polymer, 20 minutes to 4 hours. The yield of 4-aminocyclohexanol is 85–90%.

EXAMPLE 13

Hydrogenation of maleic acid to succinic acid 5 ml of the polymeric catalyst solution of Example 2 are reacted with 12.5 ml of methanol and 7,5 ml of distilled water and flushed three times with $H_2$ in a hydrogenation vessel. It is then pre-activated under $H_2$ for 30 minutes. 1 mMol of maleic acid is added and hydrogenated for 2 hours at 20° C. and 1 bar. The reaction mixture is then filtered through a membrane with an exclusion range of 10,000. The filtrate contains a 97% yield of succinic acid.

EXAMPLE 14

Hydrogenation of unsaturated to saturated fatty acids 10 ml of the catalyst solution of Example 2 are diluted with 30 ml of methanol, flushed three times with $H_2$ in a hydrogenation vessel and pre-activated under H₂ for 30 minutes. 1 mMol of linoleic acid is added and hydrogenated for 20 minutes. After dia filtration a filtrate is obtained containing pure stearic acid in 94% yield.

Under the same conditions other saturated fatty acids can by hydrogenated, for example oleic acid to stearic acid.

EXAMPLE 15

Hydrogenation of alkenes and alkines to alkanes

The hydrogenation is carried out analogously to Example 14 with 1 mMol of cyclohexane, pentine or hexine-2. The hydrogenation is completed in 20 minutes. There is obtained cyclohexane, n-pentane or n-hexane, respectively, in quantitative yield.

EXAMPLE 16

Hydrogenolytic splitting of benzyl esters 10 ml of the catalyst solution produced according to Example 2 are diluted with 20 ml of methanol and 20 ml of water. The hydrogenation vessel is flushed three times with H₂ and preactivated by stirring under H₂ for 30 minutes. There is then added 1 g of polymerpeptide of polyethylene glycol (PEG) bound by one benzyl ester group

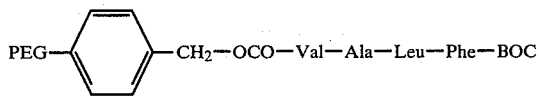

and hydrated 25 minutes. It is then dia filtered through a membrane with an exclusion range of 10,000. The peptide is obtained from the filtrate by freeze drying. The yield is 98%.

EXAMPLE 17

5.5 mg PdCl₂×2 (9-cyano-anthracene) (=1 mg Pd) are dissolved in 0.5 ml N-methylpyrrolidone and diluted with 40 ml of a 1% solution of polyvinylpyrrolidone (molecular weight about 200 000) in n-propanol. Thereafter 0.25 ml 2% triethylamine in n-propanol are added and the mixture is reduced with hydrogen. Under exclusion of air 5 ml of linseed oil are added to the solution, which changes its color to dark brown within 1 hour, with the aid of a pipette and the mixture is hydrogenated under stirring and at room temperature and a hydrogen pressure of 1 bar. After a take-up of 200 ml hydrogen (time:104 minutes) the hydrogenation step is completed. The solvent is evaporated by means of a rotary evaporator and from the residue the obtained hydrogenated oil is extracted with petrol ether. After evaporating the petrol ether the obtained hydrogenated oil is sponified with alcoholic potassium hydroxide. The obtained fatty acids are esterified with diazomethane and analyzed by gas chromatography. The petrol ether-unsoluble polymeric catalyst may be dissolved in n-propanol and may be re-used for hydrogenation (see table II).

EXAMPLE 18

The method of Example 17 is repeated with the exception that the cyano-anthracene complex used in this example is replaced by 4.6 mg PdCl₂×2 β-naphthonitrile (=1 mg Pd) (see table I).

EXAMPLE 19

The method described in Example 17 is repeated with the exception that instead of the cyano-anthracene complex 4,0 mg PdCl₂×2 (1-phenylethylamine) (=1 mg Pd) are used (see table III).

EXAMPLE 20

5.4 mg PdCl₂×2 (1,1-diphenylethylamine) are dissolved in 0.5 ml N-methylpyrrolidone and diluted with 40 ml 1% polyvinylpyrrolidone solution (molecular weight about 200 000). After adding 0.25 ml triethylamine-n-propanol solution the mixture is reduced with hydrogen at room temperature. After 1 hour and under exclusion of air 5 ml linseed oil are added to the solution with the aid of a pipette and the mixture is hydrogenated until the hydrogen take-up is completed (after approximately 250 ml). The solution is ultrafiltrated, the filtrate is concentrated, the residual hydrogenated oils are saponified and esterified with diazomethane and analyzed by gas chromatography. The retentate is diluted with n-propanol and may be used for further hydrogenation (see table IV).

EXAMPLE 21

The method as described in Example 17 is repeated with the exception that instead of polyvinylpyrrolidone used in Example 17, polyvinylpyridine is used as the polymer.

EXAMPLE 22

The procedure of Example 17 is repeated using linolenic acid methyl ester as oil for the hydrogenation.

TABLE I

Hydrogenation of 5 g Linseed Oil with PdCl₂ × 2R—PVP in n-Propanol

| ml H₂-uptake | linolenic acid % | linolic acid % | oleic acid % | stearic acid % | palmitic acid % | reaction time in minutes |
|---|---|---|---|---|---|---|
| 0 | 46 | 19 | 23 | 5 | 7 | 0 |
| 100 | 19 | 30 | 37 | 6 | 8 | 50 |
| 150 | 3 | 31 | 52 | 5 | 7 | 75 |
| 200 | 0 | 5 | 77 | 9 | 9 | 100 |

R = β-naphthonitrile
PVP = polyvinylpyrrolidone

TABLE II

Hydrogenation of 5 g Linseed Oil with PdCl₂ × 2R—PVP in n-Propanol

| ml H₂-uptake | linolenic acid % | linolic acid % | oleic acid % | stearic acid % | palmitic acid % | reaction time in minutes |
|---|---|---|---|---|---|---|
| 0 | 46 | 19 | 23 | 5 | 7 | 0 |
| 100 | 19 | 27 | 40 | 6 | 8 | 52 |
| 150 | 10 | 30 | 48 | 4 | 8 | 78 |
| 200 | 0 | 22 | 65 | 5 | 8 | 104 |

R = 9-cyano-anthracene
PVP = polyvinylpyrrolidone

TABLE III

Hydrogenation of 5 g Linseed Oil with PdCl₂ × 2R—PVP in n-Propanol

| ml H₂-uptake | linolenic acid % | linolic acid % | oleic acid % | stearic acid % | palmitic acid % | reaction time in minutes |
|---|---|---|---|---|---|---|
| 0 | 46 | 19 | 23 | 5 | 7 | — |

TABLE III-continued

Hydrogenation of 5 g Linseed Oil with PdCl$_2$ × 2R—PVP in n-Propanol

| ml H$_2$-uptake | linolenic acid % | linolic acid % | oleic acid % | stearic acid % | palmitic acid % | reaction time in minutes |
|---|---|---|---|---|---|---|
| 100 | 18 | 22 | 43 | 8 | 9 | 40 |
| 150 | 14 | 25 | 45 | 8 | 8 | 60 |
| 200 | 3 | 20 | 59 | 9 | 9 | 85 |

R = 1-phenyl-ethyl-amine
PVP = polyvinylpyrrolidone

TABLE IV

Hydrogenation of 5 g Linseed Oil with PdCl$_2$ × 2R—PVP in n-Propanol

| ml H$_2$-uptake | linolenic acid % | linolic acid % | oleic acid % | stearic acid % | palmitic acid % | reaction time in minutes |
|---|---|---|---|---|---|---|
| 0 | 46 | 19 | 23 | 5 | 7 | 0 |
| 50 | 34 | 22 | 30 | 6 | 8 | 50 |
| 100 | 25 | 24 | 33 | 9 | 9 | 100 |
| 150 | 18 | 29 | 40 | 6 | 7 | 170 |
| 200 | 0 | 23 | 53 | 15 | 9 | 620 |

R = 1,1-diphenylethylamine
PVP = polyvinylpyrrolidone

The above tables I to IV clearly show that during the hydrogenation of linseed oil the amount of saturated fatty acids contained in the starting material, namely stearic acid and palmitic acid, remains practically constant. In contrast thereto the amount of the threefold unsaturated linoleic acid diminishes stepwise. Therefore the amount of linoleic acid and oleic acid increases.

A trans-isomerization does not take place up to a hydrogen uptake of 100 to 150 ml—corresponding to an already solid fat—to any considerable extent. Thus upon the hydrogenation according to table IV, for example after 100 ml H$_2$-uptake only 11% trans-isomers and after 150 ml H$_2$-uptake only 17% trans-isomers were found. In contrast thereto the prior art methods yield to a 60 to 80% conversion into trans-isomers during the hydrogenation step.

The hydrogenation of fats with the low molecular ligand hydrogenation catalyst according to the invention is preferably carried out in lower aliphatic alcohols, particularly in n-propanol While the invention has been illustrated with respect to the production of specific catalysts and the use thereof in specific hydrogenation reactions, it is apparent that variations and modifications can be made.

We claim:

1. As a polymeric hydrogenation catalyst soluble in at least one solvent selected from the group consisting of water, methanol, propanol, N-methylpyrrolidone and mixtures thereof, a synthetic or semi-synthetic polymer having as a metal binding functional group a sulfonic acid, carbonyl, carboxyl, amino, imino, hydroxyl, cyano or acid amide group and being directly bound by covalent or secondary valent bonds by said metal binding functional group to a metal or salt of said metal, the metal being of the eighth subgroup of the periodic system, said polymer being selected from the group consisting of polyvinyl alcohol, polyacrylonitrile, polyacrylic acid, polyvinyl pyrrolidone, carboxymethyl cellulose, polyethylene glycols, polypropylene glycols, polyurethanes, polyvinyl amines, polyethylene imines, polyamides, polypeptides and polymeric polyhydroxy compounds, and mixtures of said polymers.

2. Hydrogenation catalyst according to claim 1 and also including low molecular ligands.

3. Hydrogenation catalyst according to claim 2 wherein the ligand is selected from the group consisting of phosphines, carbon monoxide, halogenides, cyanides, nitriles, alkenes, and alkanes.

4. Hydrogenation catalyst according to claim 3 wherein the low molecular ligands are selected from the group consisting of:

(a) an amine;
(b) an amino acid;
(c) a nitrile of the general formula I:

$$R-(CHR^1)_n-CN \qquad (I)$$

wherein R is a phenyl, naphthyl, anthracenyl or phenanthrenyl radical which may be substituted by one or several linear or branched C$_1$ to C$_6$ alkyl radicals, or wherein R is a linear or banched C$_1$ to C$_6$ alkyl radical, R$^1$ designates hydrogen or a linear or branched C$_1$ to C$_6$ alkyl radical and wherein n has the meanings 0, 1 or 2;

(d) a phosphine of the general formula II
$$P(R^2)_3 \qquad (II)$$

wherein the radicals R$^2$ may be the same or different and may designate linear or branched C$_1$ to C$_6$ alkyl radicals, phenyl or phenyl substituted by one or more linear or branched C$_1$ to C$_6$ alkyl radicals or C$_1$ to C$_6$ alkoxy radicals, including unsubstituted triphenylphosphine;

(e) an olefin or alkine, including cyclic olefins and alkines; or (f) a phosphorylide.

5. Hydrogenation catalyst according to claim 4 wherein the metal is zero-valent palladium or a palladium salt.

6. Hydrogenation catalyst according to claim 5 wherein the low molecular ligands are selected from the group consisting of primary, secondary and tertiary amines with bulky aliphatic, alicyclic or aromatic substituents.

7. Hydrogenation catalyst according to claim 6 wherein the low molecular ligands are amines with branched aliphatic groups with 4 to 6 carbon atoms.

8. Hydrogenation catalyst according to claim 6 wherein the low molecular ligands are selected from the group consisting of primary, secondary and tertiary amines with cyclopentyl, cyclohexyl and adamantyl radicals.

9. Hydrogenation catalyst according to claim 6 wherein the low molecular ligands are araliphatic amines the alkyl portion of which comprises 1 to 6 carbon atoms and which contain at least one aromatic radical bound to the aliphatic chain.

10. Hydrogenation catalyst according to claim 9, wherein the low molecular ligands are of the general formula III:

$$H_2N-R^3 \qquad (III)$$

wherein R$^3$ is 1-phenylethyl, 1,1-diphenylethyl, 1-phenylpropyl, 1,1-diphenylpropyl, 2-phenylethyl, 1,2-diphenylethyl, 2,2-diphenylethyl, 1,2-diphenylpropyl or 2,2-diphenylpropyl.

11. Hydrogenation catalyst according to claim 4 wherein the low molecular ligands are amino acids with bulky groups in 1- to 3-position with respect to the amino groups.

12. Hydrogenation catalyst according to claim 11 wherein the low molecular ligand is selected from the group consisting of diphenylglycine, norleucine, leucine, isoleucine, tert.-leucine and valine.

13. Hydrogenation catalyst according to claim 4 wherein the low molecular ligand is 9-cyanoanthracene or β-naphthonitrile.

14. Hydrogenation catalysts according to claim 1 wherein said polymer is polyvinyl pyrrolidone and wherein said metal is palladium.

15. As a polymeric hydrogenation catalyst soluble in at least one solvent selected from the group consisting of water, methanol, propanol and N-methylpyrrolidone and mixtures thereof, a synthetic or semi-synthetic polymer having as a metal binding functional group a sulfonic acid, carbonyl, carboxyl, amino, imino, hydroxyl, cyano or acid amide group and being directly bound by covalent or secondary valent bonds by said metal binding functional groups to a metal or salt of said metal in an amount of about 0.1 to 10% of metal by weight of polymer, the metal being of the eighth subgroup of the periodic system, said polymer being selected from the group consisting of polyvinyl alcohol, polyacrylonitrile, polyacrylic acid, polyvinyl pyrrolidone, carboxymethyl cellulose, polyethylene glycols, polypropylene glycols, polyurethanes, polyvinyl amines, polyethylene imines, polyamides, polypeptides and polymeric polyhydroxy compounds, and mixtures of said polymers.

16. Hydrogenation catalyst according to claim 15 wherein said polymer is polyvinyl pyrrolidone and wherein said metal is palladium.

17. As a polymeric hydrogenation catalyst soluble in at least one solvent selected from the group consisting of water, methanol, propanol and N-methylpyrrolidone and mixtures thereof, a synthetic or semi-synthetic polymer having as a metal binding functional group a sulfonic acid, carbonyl, carboxyl, amino, imino, hydroxyl, cyano, or acid amide group and being directly bound by covalent or secondary valent bonds by said metal binding functional group to a metal or salt of said metal, the metal being selected from the group consisting of Fe, Co, Ni, Ru, Rh, Pd, Os, Ir and Pt bound to said polymer in an amount of about 0.1 to 10% of metal by weight of polymer, said polymer being selected from the group consisting of polyvinyl alcohol, polyacrylonitrile, polyacrylic acid, polyvinyl pyrrolidone, carboxymethylcellulose, polyethylene glycols, polypropylene glycols, polyurethanes, polyvinyl amines, polyethylene imines, polyamides, polypeptides and polymeric polyhydroxy compounds, and mixtures of said polymers.

18. Hydrogenation catalyst according to claim 17, wherein said polymer is polyvinyl pyrrolidone and wherein said metal is palladium.

* * * * *